United States Patent Office 3,565,892
Patented Feb. 23, 1971

---

3,565,892
PREPARATION OF SUBSTITUTED IMIDAZOLES AND PRODUCTS RESULTING THEREFROM
Goro Asato, Titusville, and Jackson Pollard English, Princeton, N.J., assignors to American Cyanamid Company, Stamford, Conn., a corporation of Maine
No Drawing. Filed May 6, 1968, Ser. No. 727,013
Int. Cl. C07d 49/36
U.S. Cl. 260—240
9 Claims

ABSTRACT OF THE DISCLOSURE

This invention relates to a novel process for the synthesis of 1 - substituted - 5 - nitro - 2 - imidazolecarboxaldehydes and 1-substituted - 5 - nitro-2-imidazolecarboxylic acids by the ozonization of a $\beta$-(1-substituted-5-nitro-2-imidazolyl)styrene derivative. The products prepared by the present process are useful particularly in the preparation of compounds which are effective against protozoal and bacterial infections in poultry and animals.

BACKGROUND OF THE INVENTION

The above-identified imidazolecarboxaldehydes are described in Netherlands Pat. 6,503,442, published Sept. 20, 1965. These compounds are said to be useful for the treatment of protozoal and bacterial infections in poultry and animals and are particularly effective against *Histomonas meleagridis*, causative agent for histomoniasis in turkeys, *Trichomonas vaginalis* causative agent for trichomoniasis, Salmonella, Streptococci and PPLO (i.e., pleuropheumonia) infections.

According to the patent, compounds of the formula:

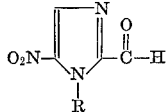

are obtained by oxidation of a 1-(R)-substituted 5-nitroimidazole having an oxidizable substituent in the 2-position. The reaction appears to be straightforward; however, on examination it becomes clear that it is not entirely satisfactory.

Heretofore it has been suggested that the 1-substituted-5-nitro-2-imidazolecarboxaldehydes may be prepared from the 1-substituted 2-($\beta$-phenylvinyl)-5-nitroimidazole by oxidation with an alkali metal periodate and osmium tetroxide. However, in practice it has been found that the reaction proceeds in less than expeditious manner, yields are low (i.e., of the order of about 15%) and the oxidizing agent is somewhat expensive. Moreover, osmium tetroxide, while used only in relatively small amounts, is difficult and disagreeable to handle. The compound sublimes well below its boiling point, is poisonous and will cause damage to eyes, respiratory tract and skin on contact.

In preparation of imidazolecarboxaldehydes from the 1-substituted 2-hydroxyalkyl-5-nitroimidazoles, product yields are generally superior to those obtained by the previously described procedure, but synthesis of the starting material, i.e., the 1-substituted-2-hydroxyalkyl-5-nitroimidazole, is tedious. Where selenium dioxide is used as the oxidizing agent, extreme care must be taken to assure complete removal thereof from the formed product since said compound is highly toxic to mammals and when manganese dioxide is employed, product yields are only of the order of 30%. Use of lead tetracetate as the oxidizing agent appears to improve product yields slightly; however, the process is still not entirely satisfactory, for this agent is costly and the reaction is time-consuming. Still other oxidizing agents have been suggested for use in the preparation of 1-substituted-5-nitro-2-imidazolecarboxaldehydes, yet each leaves something to be desired.

BRIEF SUMMARY OF THE INVENTION

This invention relates to an improved process for the preparation of 1-substituted-5-nitro-2-imidazolecarboxaldehydes and 1-substituted-5-nitro-2-imidazolecarboxylic acids of the formula:

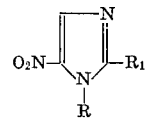

wherein R represents a substituent selected from the group consisting of lower alkyl (C–1 to C–4), phenyl lower alkyl, hydroxyloweralkyl and lower alkanoyloxy lower alkyl and $R_1$ is —CHO or —COOH, by ozonization of $\beta$-(1-substituted-5-nitro-2-imidazolyl)styrenes. The invention also relates to a process for preparing the thiosemicarbazone, semicarbazone and hydroxylamine derivatives of the above-identified compounds.

PREFERRED EMBODIMENT OF THE INVENTION

In accordance with the present invention 1-substituted-5-nitro-2-imidazolecarboxaldehydes and 1-substituted-5-nitro-2-imidazolecarboxylic acids are prepared by the ozonization of a $\beta$-(1-substituted-5-nitro-2-imidãzolyl)-styrene of the formula:

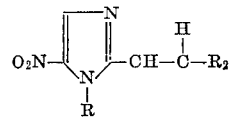

wherein R is loweralkyl, phenylloweralkyl, hydroxyloweralkyl or lower alkanoyloxyloweralkyl; and $R_2$ is phenyl, chlorophenyl, nitrophenyl, loweralkylphenyl, diloweralkylphenyl, lower alkoxyphenyl, dilower alkoxyphenyl, hydroxyphenyl, lower alkoxyhydroxyphenyl, dichlorophenyl, diloweralkyl aminophenyl, naphthyl or furyl, in the presence of a solvent.

The styrenes which lend themselves to use in the process of the present invention are rather varied. As is stated, R in the above formula may represent a lower alkyl group ($C_1$ to $C_4$) such as methyl, ethyl or isopropyl; a phenylloweralkyl such as benzyl or phenethyl; and $R_2$ is as described above. Conveniently, the imidazolecarboxylic acids are represented by the formula:

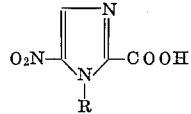

wherein R is as described above and are prepared directly from the corresponding styrene by ozonization thereof in the presence of a loweralkylcarboxylic acid such as formic, acetic or propionic acid. Preferably the reaction is conducted at a temperature between about 0° and 25° C. but can be carried out at lower temperatures, for example, to about —70° C. Imidazolecarboxaldehydes described by the formula:

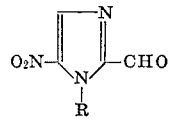

wherein R is hydroxyloweralkyl, are prepared in similar manner by ozonization of the corresponding 2-imidazolyl styrene. The reaction can be carried out over a wide temperature range, i.e., from about −70° C. to 50° C., and preferably between about 0° C. and 50° C. in the presence of a solvent such as loweralkyl alcohols, lower alkoxyloweralkyl alcohols, loweralkyl esters, acetonitrile, chorinated hydrocarbons, strong mineral acids, mixtures of these solvents and in aqueous-alcoholic mixtures. In practice it is preferable to conduct the ozonization in the presence of an alcohol or an aqueous-alcoholic mixture, for under the latter conditions maximum product yields have been obtained.

When it is desired to prepare imidazolecarboxaldehydes as depicted above, but wherein R represents a loweralkyl group such as methyl, ethyl, propyl, or the like; aralkyl such as benzyl, phenethyl, p-Cl-benzyl, m-nitrobenzyl, 2-(o-methoxy phenyl)ethyl, and 2-naphthylmethyl; or a loweralkyl ester such as acetoxyethyl, propionyloxymethyl and propionyloxyethyl, the appropriate imidazolylstyrene is ozonized in the presence of a solvent such as loweralkyl alcohol, lower alkoxy lower alkyl alcohol aqueous-alcoholic mixture, chlorinated hydrocarbon, loweralkyl ester, acetonitrile or strong mineral acid and preferably in the presence of an alcohol or alcohol-water mixture. Such solvents include methanol, ethanol, methyl Cellosolve, ethyl Cellosolve, water mixtures of Cellosolve, ethyl acetate, methyl formate, methyl propionate, methylene chloride, sulfuric acid or hydrochloric acid. Following ozonization the thus prepared mixture is treated with a reducing agent such as sodium thiosulfate, sodium bisulfite, sulfurous acid, alkali metal iodide, dimethylsulfide, or a trialkyl phosphite to obtain the imidazolecarboxaldehyde, or heated to about 85° C. These treatments are preferably carried out in the presence of water. As with the preparations previously described, this reaction can be carried out over a wide temperature range, e.g., −70° C. to 50° C. but is generally most satisfactorily conducted at a temperature between about 0° C. and 50° C.

The desired product (i.e., the aldehyde

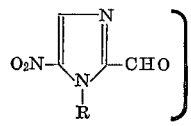

is readily recovered from the reduced or heat-treated mixture by concentration of said mixture under reduced pressure followed by extraction with a suitable solvent such as a loweralkyl ester, chlorinated hydrocarbon or ether. Chloroform and ethyl acetate are particularly well suited for use in this latter step.

Where it is desirable to prepare the thiosemicarbazone, semicarbazone or oxime derivative of the aldehyde, the above mentioned concentrated mixture can be treated with a semicarbazide or thiosemicarbazide of the formula:

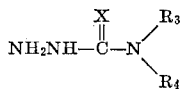

wherein $R_3$ and $R_4$ represent members selected from the group consisting of hydrogen and loweralkyl (C–1 to C–4) and X is sulfur or oxygen, in the presence of an acid such as hydrochloric or sulfuric acid. The reaction is graphically illustrated as follows:

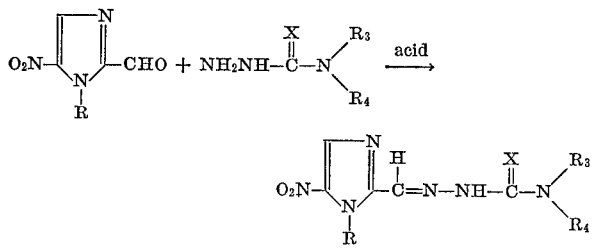

The concentrated mixture may also be treated with hydroxylamine hydrochloride to obtain the oxime derivative. The reaction is graphically illustrated as follows:

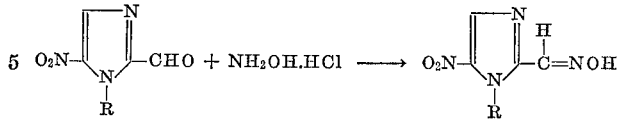

The above compounds having the structure

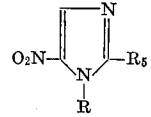

wherein R is benzyl; $R_5$ is CHO, CH=CH—$C_6H_5$, or

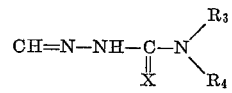

and X, $R_3$ and $R_4$ are as described above, are of particular interest in the present invention since they are new and useful in the treatment of protozoal infections in animals.

This process of the invention is characterized by several advantages over prior art processes including operability at ordinary temperature and pressure, improved product yields (i.e., as high as 96%) and elimination of the tedious work-up procedures frequently required for preparation of starting materials required for known processes. Moreover, it is rather surprising that the process of the invention gives high product yields and is essentially free of production of contaminating side products which could be unstable and/or difficult to separate from the desired product.

As indicated, the compounds prepared by the process of the present invention are useful for the treatment of bacterial and protozoal infections in poultry and animals. These compounds find further utility as intermediates in the preparation of heteroaryl nitroimidazoles such as 2-(2-amino-5-thiadiazolyl)-1-methyl-5-nitroimidazole, and 2-(2-amino-5-oxadiazolyl)-1-methyl-5-nitroimidazole which are effective when orally administered at 125–500 p.p.m. or more in the diet, for controlling *Eimeria tenella* in poultry.

To prepare such heteroaryl nitroimidazoles from the imidazolecarboxaldehydes of the present invention, the latter compounds are generally dissolved in an organic solvent such as ethanol or water and treated with a semicarbazide or thiosemicarbazide to form the semicarbazone or thiosemicarbazone of the 1-substituted-5-nitro-2-imidazolecarboxaldehyde. Subsequently, the thiosemicarbazones are cyclized with suitable oxidizing agents such as ferric chloride, ferric ammonium sulfate, ferric nitrate, sodium ferric oxalate or the like, and the semicarbazones are cyclized in the presence of an agent such as sodium hypobromite, bromine-sodium acetate, sodium hypoiodite or the like. The reactions are generally carried out at an elevated temperature, i.e., 50° C. to 150° C.

DETAILED DESCRIPTION

The following examples which set forth specific conditions of the processes of the present invention are provided as further exemplification of the present invention and are not intended to be construed as limiting the invention.

EXAMPLE 1

Preparation of 1-methyl-5-nitro-2-imidazolecarboxaldehyde and its thiosemicarbazone A suspension of 385 g. (1.68 moles) of β-(1-methyl-5-nitro-2-imidazolyl)styrene in a mixture of 4200 ml. of methanol and 175 ml. of water at 25° C. is treated with 0.08 mole/hr. of ozone in an oxygen stream for 18 hours. The oxygen flow rate is 0.04 cubic feet per minute. The suspension slowly turns into a pale yellow solution during this time, and the temperature rises 1° to 3° C. An ice-cold solution of 504 g. (3.36 moles) of sodium iodide in a mixture of 1660 ml. of water and 250 ml. of glacial acetic acid is slowly added in about 40 minutes to the stirred reaction mixture. External cooling or controlling the rate of addition is employed to keep the reaction temperature below 40° C. Twenty minutes after the sodium iodide addition a solution of 530 g. (3.36 moles) of sodium thiosulfate in 2900 ml. of water is added. The reaction mixture is filtered, and the filtrate evaporated at 70–75° C. at 15–20 mm. Hg to give a thick, yellow slurry which no longer has the odor of benzaldehyde. The slurry is treated with 2000 ml. of ethyl acetate, 400 ml. of water, shaken well, and filtered to remove sulfur. The organic layer of the filtrate is separated, washed with 100 ml. of saturated sodium bicarbonate solution, and dried with anhydrous sodium sulfate or magnesium sulfate. Evaporation of the solvent gives a tacky orange solid which is washed with 250 ml. of n-hexane, and dried to give 102 g. (39%) of orange product melting at 86–89° C. The aqueous layer of the initial filtration is treated with a solution of 91.1 g. (1.0 mole) of thiosemicarbazide in a mixture of 500 ml. of water and 90 ml. of concentrated hydrochloric acid. After heating for 40 minutes on a steam bath, the mixture is allowed to stand at 25° C. for 17 hours. The yellow product thus formed is collected, washed well with water, and dried to give 157 g. of 1-methyl-5-nitro-2-imidazolecarboxaldehyde thiosemicarbazone.

When desired, the ethyl acetate extraction is omitted for the isolation of 1-methyl-5-nitro-2-imidazolecarboxaldehyde and the aqueous layer is treated with thiosemicarbazide and hydrogen halide, semicarbazide hydrogen halide, or hydroxylamine hydrogen halide and then the corresponding thiosemicarbazone, semicarbazone, or oxime of 1-methyl-5-nitro-2-imidazolecarboxaldehyde is obtained. The substitution of methanol with methyl Cellosolve or ethyl Cellosolve gives comparable results.

EXAMPLE 2

Preparation of 1-methyl-5-nitro-2-imidazolecarboxaldehyde and its oxime

In the manner described in Example 1, except for the use of less glacial acetic acid (200 ml.), 385 g. (1.68 moles) of β-(1-methyl-5-nitro-2-imidazolyl)styrene is treated with ozone to give 100 g. (39%) of 1-methyl-5-nitro-2-imidazolecarboxaldehyde from the ethyl acetate extraction. The aqueous layer is then treated with 70 g. (1.0 mole) of hydroxylamine hydrochloride, warmed for 30 minutes on a steam bath, and allowed to stand for 68 hours. The white solid is collected, washed well with water, and dried under reduced pressure at 80–85° C. for 5 hours to give 128.5 g. of 1-methyl-5-nitro-2-imidazolecarboxaldehyde oxime, which represents 130 g. of 1-methyl-5-nitro-2-imidazolecarboxaldehyde (assuming 90% conversion). The real yield of 1-methyl-5-nitro-2-imidazolecarboxaldehyde is thus 230 g. (89%).

The semicarbazone derivative of the title aldehyde is also obtained in the same manner by treating the aqueous layer with semicarbazide hydrochloride instead of hydroxylamine hydrochloride.

EXAMPLE 3

Preparation of 1-methyl-5-nitro-2-imidazolecarboxaldehyde and its oxime

A suspension of 11.0 g. (0.048 mole) of β-(1-methyl-5-nitro-2-imidazolyl)styrene in 120 ml. of methanol and 5 ml. of water is treated with ozone as described in Example 1 for 50 minutes. A solution of 14.4 g. (0.096 mole) of sodium iodide in 48 ml. of water and 10 ml. of glacial acetic acid is added, and the dark solution stirred for 10 minutes. A solution of 4.7 g. (0.025 mole) of sodium meta-bisulfite in 84 ml. of water is added, and the resulting pale yellow solution filtered to remove a trace of unreacted olefin. The filtrate is evaporated at 70–75° C. at 15–20 mm. Hg to give a yellow syrup which no longer has the odor of benzaldehyde. A little water is added to dissolve a crystalline solid which appears, and the solution is then extracted 3 times with 50 ml. of ethyl acetate. The extracts are dried with magnesium sulfate, filtered, and evaporated to afford 4.5 g. (60%) of 1-methyl-5-nitro-2-imidazolecarboxaldehyde melting at 86–89° C. The aqueous layer from the extraction operation is treated with 2.0 g. (0.029 mole) of hydroxylamine hydrochloride, warmed for 10 minutes on a steam bath, and allowed to stand for 16 hours. The solid is collected, washed with water, and dried to give 2.6 g. of 1-methyl-5-nitro-2-imidazolecarboxaldehyde oxime, which represents 2.64 g. of 1-methyl-5-nitro-2-imidozolecarboxaldehyde (assuming 90% conversion). The real yield of 1-methyl-5-nitro-2-imidazolecarboxaldehyde is therefore 7.14 g. (96%).

EXAMPLE 4

Preparation of 1-methyl-5-nitro-2-imidazolecarboxaldehyde oxime

The compound β-(1-methyl-5-nitro-2-imidazolyl)styrene in a mixture of 120 ml. of water and 25 ml. of methanol is ozonized in the manner described in Example 1. Upon evaporation of the ethyl acetate extract there is obtained a yellow semi-solid which is dissolved in 50% aqueous ethanol and treated with hydroxylamine hydrochloride. The solid is then collected and dried to give 1-methyl-5-nitro-2-imidazolecarboxaldehyde oxime melting at 245–249° C.

EXAMPLE 5

Preparation of 1-methyl-5-nitro-2-imidazolecarboxaldehyde

In 25 ml. of methylene chloride at −35° C.±10°, a slurry of 2.3 g. of β-(1-methyl-5-nitro-2-imidazolyl)styrene is treated with ozone for 40 min. to give an off-white, slightly turbid mixture. To this mixture, 3 g. of sodium iodide in 40 ml. water and 2 ml. acetic acid is added at 0° for 5 minutes, which is followed with 4 g. of sodium thiosulfate in 40 ml. of water. The mixture is extracted with three 25 ml. volumes of chloroform; the extracts are dried over magnesium sulfate, filtered and evaporated to dryness to give a semisolid. This is dissolved in 25 ml. of ethyl acetate, filtered, and the filtrate extracted twice with 20 ml. volumes of 16 N hydrochloric acid. The acid extracts are made alkaline with saturated sodium carbonate solution or preferably saturated sodium bicarbonate solution. Extraction of this mixture with chloroform (four times with 20 ml. volumes) followed by drying of extracts and evaporation of chloroform from extracts gives the aldehyde.

EXAMPLE 6

Preparation of 1-methy-5-nitro-2-imidazolecarboxaldehyde

In 50 ml. of ethyl acetate at −25° to −45° C., 4.6 g. of β-(1-methyl-5-nitro-2-imidazolyl)styrene is treated with ozone in the manner described in Example 1 for 1½ hours (until nearly a light-yellow solution is obtained). The method employed in Example 1 for the work-up gives a 17.5% yield of the thiosemicarbazone derivative, melting point 239° C. In a similar run at −10 to −20° C., after this ozonized mixture is treated with sodium iodide and then sodium thiosulfate, the mixture is neutralized with sodium bicarbonate and extracted with ethyl acetate. The ethyl acetate extracts are dried, and evaporated to dryness to give an oil. This oil is dissolved in ether, diluted with petroleum ether to give 50–75% yields of the solid aldehyde.

The product 1-methyl-5-nitro-2-imidazolecarboxaldehyde is also obtained by ionization of the following olefins in the above manner:

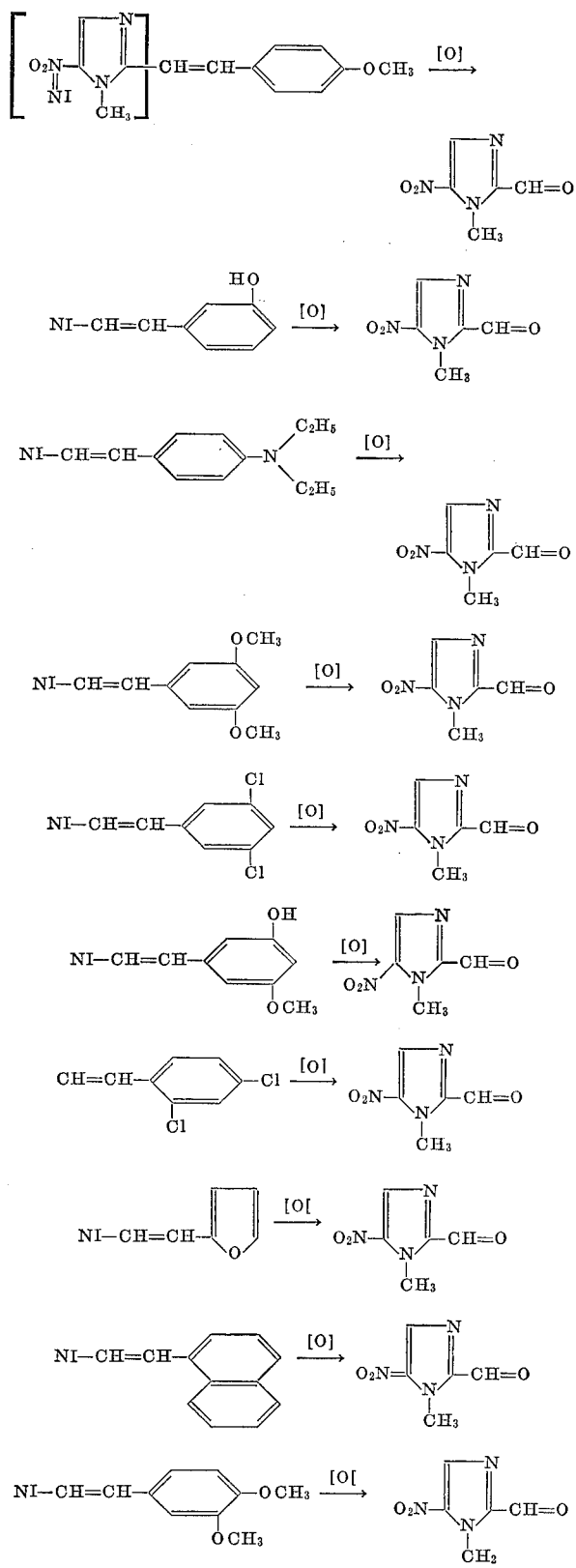

The above are obtained by treating 1,2-dimethyl-5-nitroimidazole with the corresponding aldehydes in alcohol in the presence of potassium tertiary butoxide as described in Example 9.

EXAMPLE 7

Preparation of 1-methyl-5-nitro-2-imidazolecarboxaldehyde

In 60 ml. of methanol, 4.6 g. (0.02 mole) of β-(1-methyl-5-nitro-2-imidazolyl)styrene is treated with ozone for 25 minutes at room temperature as described in Example 1 to give a turbid solution. The mixture is mixed with 50 ml. of water and distilled under reduced pressure at 70° C. to give a deposit of a yellow oil. This oil is extracted with ethyl acetate, and the solution dried and distilled under reduced pressure. At 85° C. (bath temperature), the yellow-green oil is converted into a red-brown mixture. The mixture is treated with 50% aqueous methanol and evaporated to dryness under reduced pressure at 75° C. (bath temperature) on a rotary evaporator to give 2.7 g. of 1-methyl-5-nitro-2-imidazole carboxaldehyde, melting point 74–87° C.

EXAMPLE 8

Preparation of 1-methyl-5-nitro-2-imidazolecarboxaldehyde

In 120 ml. of methanol and 5 ml. of water, 11 g. (0.048 mole) of β-(1-methyl-5-nitro-2-imidazolyl)styrene is treated with ozone at room temperature for 50 minutes as in Example 1 to give a nearly clear solution. The mixture is slowly treated with 15.8 g. of sodium thiosulfate in 75 ml. of water while the tempertaure is kept at 25–28° C. After stirring for an hour, the mixture is concentrated under reduced pressure to give a slurry. This slurry is treated with 75 ml. of water and 50 ml. of ethyl acetate, made alkaline with saturated sodium bicarbonate solution and the ethyl acetate layer separated. The aqueous layer is then extracted four times with 25 ml. volumes of ethyl acetate. The combined extracts are dried and evaporated to dryness to give 5.55 g. of 1-methyl-5-nitro-2-imidazole carboxaldehyde, melting point 88–94° C.

In isopropyl alcohol this method gives an 86% yield of crude 1-methyl-5-nitro-2-imidazolecarboxaldehyde, melting point 80–87.5° C. In concentrated hydrochloric acid this method gives 1-methyl-5-nitro-2-imidazolecarboxaldehyde after neutralization of the thiosulfate-reduced mixture and removal of benzaldehyde by steam distallation under reduced pressure.

The compound β-(1-methyl-5-nitro-2-imidazolyl)-p-chlorostyrene is ionized in the manner described above in methanol to give 1-methyl-5-nitro-2-imidazolecarboxaldehyde. β-(1-methyl-5-nitro-2-imidazolyl)-p-nitrostyrene is ionized in the manner described above in methanol to give 1-methyl-5-nitro-2-imidazolecarboxaldehyde. β-(1-methyl-5-nitro-2-miidazolyl)-p-methylstyrene is ionized in the manner described above in methanol to give 1-methyl-5-nitro-2-imidazolecarboxaldehyde.

EXAMPLE 9

Preparation of 1-isopropyl-5-nitro-2-imidazolecarboxaldehyde

In 50 ml. of methanol and 2.08 ml. of water, 6.45 g. (0.025 mole) of β-(1-isopropyl-5-nitro-2-imidazolyl)styrene is ozonized as in Example 1 and then treated with 9.5 g. of sodium thiosulfate in 45 ml. of water below 30° C. After 40 minutes of additional stirring, the mixture is placed on a rotary evaporator at 70–75° C. (bath temperature) under 15–20 millimeters of pressure to remove benzaldehyde and methanol. The residual material is mixed with 50 ml. of ethyl acetate and 5 ml. of water and filtered. The insoluble solid is further washed with 10 ml. of ethyl acetate. The combined ethyl acetate layers are washed with saturated sodium bicarbonate solution. The solution bicarbonate solution and the remaining aqueous layer were combined and extracted three times with 15 ml. portions of ethyl acetate. The ethyl acetate extracts are dried over magnesium sulfate and evaporated to dryness to give 3.75 g. of semisolid 1-isopropyl-5-nitro-2-imidazolecarboxaldehyde. A sublimed sample of this material melts at 60–61.5° C.

If the ozonized, aqueous solution, after reduction and removal of methanol and benzaldehyde is treated with either thiosemicarbazide and mineral acid or semicarbazide hydrochloride and heated, the thiosemicarbazone, melting point 217–219° C., or the semicarbazone, melting point 200–222° C., is obtained.

The compound β-(1-isopropyl-5-nitro-2-imidazolyl)styrene is prepared by stirring 36.18 g. of 1-isopropyl-2-methyl-5-nitroimidazole with 114 ml. of benzaldehyde in 535 ml. of absolute ethanol and then adding 32.6 g. of potassium tertiary butoxide in nitrogen atmosphere at below 37° C. and heating for 35 minutes at 70–75° C. This mixture is cooled, filtered, and the solid is washed with 75% aqueous ethanol. After drying, the solid (30.62 g.) melts at 142–143° C.

The compound 1-isopropyl-2-methyl-5-nitroimidazole is prepared by reacting 2-methyl-5-nitroimidazole (101.6 g.) in 171.2 g. isopropyl tosylate at 120° C. for 1½ hours and pouring the hot reaction mixture into a beaker. After cooling and treating the reaction mixture with 200 ml. of saturated sodium bicarbonate solution, 800 ml. of 2 N sodium hydroxide is added and the pH is kept at 10 by periodic addition of 10 N sodium hydroxide. The resulting solution is then extracted with ether several times. Evaporation solution is then extracted with ether several times. Evaporation of the dried ether extracts gives 21.29 g. of 1-isopropyl-2-methyl-5-nitroimidazole, melting point 38–41° C.

EXAMPLE 10

Preparation of 1-ethyl-5-nitro-2-imidazolecarboxaldehyde

A slurry of β-(1-ethyl-5-nitro-2-imidazole)styrene (4.27 g. or 0.175 mole) in 350 ml. of methanol containing 14.6 ml. of water at 25° C. is treated with ozone as in Example 1 until a nearly clear, pale-yellow solution is obtained. Subsequently, the mixture is treated with 42 g. of sodium iodide in 138 ml. of water and 20.3 ml. of glacial acetic acid at 25° C. The mixture is stirred for 40 minutes and 44.1 g. (0.288 mole) of sodium thiosulfate in 242 ml. of water added. The mixture is filtered, and the filtrate concentrated at 70–75° C. under 15–20 mm. of pressure to give 450 ml. of solution. The solution is acidified with 50 ml. of 6 N hydrochloric acid and the benzaldehyde removed at 70–75° C. under 15–20 mm. of pressure. The residue is then neutralized with saturated sodium bicarbonate solution and extracted with ethyl acetate to give an 81.5% yield of solid aldehyde, melting point 61–67° C. after stripping. A sublimed sample of the aldehyde melts at 68–68° C. with softening at 65° C. If the aqueous, ozonized solution after benzaldehyde is removed is treated with either thiosemicarbazide and mineral acid or semicarbazide hydrochloride and heated, the thiosemicarbazone, melting point 241° C., or the semicarbazone, melting point 223–226°, is obtained. The compound β-(1-ethyl-5-nitro-2-imidazolyl)styrene is prepared from 1-ethyl-2-methyl-5-nitroimidazole in the manner described for β-(1-isopropyl-5-nitro-2-imidazolyl)styrene in Example 9; the yield is 59% and the product melts at 132–136° C. A sample purified from 95% ethanol melts at 136.5–137.5° C.

EXAMPLE 11

Preparation of 1-benzyl-5-nitro-2-imidazolecarboxaldehyde

In 45 ml. of absolute ethanol, 3.25 g. and 9 ml. of benzaldehyde are stirred under a nitrogen atmosphere while 2.8 g. of potassium t-butoxide is added. The mixture is heated at 70–75° C. for 55 minutes, cooled and poured into 100 ml. of ice-water mixture. The oil which is deposited is extracted three times with 50 ml. of chloroform. The extracts are dried and evaporated to dryness to give 5.55 g. of oil. This oil is treated with methanol, decanted, and the remaining material is treated with 5 ml. of methanol. Water is then added to give a yellow solid [β-(1-benzyl-5-nitro-2-imidazolyl)styrene], melting point 105–110.5° C. β-(1-benzyl-5-nitro-2-imidazolyl)styrene (0.3 g.) in 5 ml. of methanol and a drop of water is treated with ozone as described in Example 1 and the clear solution is treated with 0.328 g. of sodium thiosulfate in 5 ml. of water. The aqueous layer after removal of the benzaldehyde, is extracted under reduced pressure with 20 ml. of ethyl acetate, the extract dried and evaporated under reduced pressure at 70–75° C. to give 0.1 g. of liquid which consists mainly of 1-benzyl-5-nitro-2-imidazolecarboxaldehyde.

EXAMPLE 12

Preparation of 1-(2-acetoxyethyl)-5-nitro-2-imidazolecarboxaldehyde

At 0 to −10° C., 20 g. (0.0665 mole) of β-[1-(2-acetoxyethyl)-5-nitro-2-imidazolyl]-styrene in 400 ml. of methanol and 10 ml. of water is ozonized as in Example 1 for 50 minutes to give a nearly clear solution. A solution of 30 g. of sodium iodide in 250 ml. of water and 20 ml. of glacial acetic acid is added to the stirred mixture and after 20 minutes, 40 g. of sodium thiosulfate in 250 ml. of water is added. The solution is then stripped under reduced pressure to remove methanol and benzaldehyde at 70–80° C. The remaining mixture is neutralized with sodium bicarbonate, saturated with sodium chloride, and extracted with three 100 ml. volumes of chloroform. The chloroform is evaporated and a mixture of solid and liquid is obtained. The mixture is treated with ethyl acetate, filtered, and the ethyl acetate is removed from the filtrate to give 13.46 g. of 1-(2-acetoxyethyl)-5-nitro-2-imidazolecarboxaldehyde.

EXAMPLE 13

Preparation of 5,6-dihydro-3-nitro-8H-imidazo-[2,1-c][1,4]oxazin-8-ol

In 580 ml. of methanol and 15 ml. of water, 39 g. (0.15 mole) of β-[1(β-hydroxyethyl)-5-nitro-2-imidazolyl]-styrene is treated with ozone at 5° C.±3° for 3 hours as in Example 1. This mixture is treated with 45 g. of sodium iodide in 100 ml. of water and 30 ml. glacial acetic acid at 10–15° C. After ½ hour of stirring at about 10° C., the solid is filtered, washed with water, and then with methanol until no color is observed in the wash. This solid is dried in a vacuum oven at 80° C. for an hour to afford 22.1 g. of product, melting point 195–196° C. Recrystallization from acetone gives a white solid, melting point 206.5–207° C. (dec.). The infrared spectrum of this material shows no carbonyl absorption band; the NMR spectrum showed peaks at 1.92 τ (imidazole ring hydrogen), 2.45 τ (OH), 4.12 τ (C—H), and 5.77 τ (2-CH$_2$). The product (0.1 g.) is refluxed with 0.05 g. of thiosemicarbazide in 5 ml. of ethanol to give 0.14 g. of 1-(β-hydroxyethyl)-5-nitro-2-imidazolecarboxaldehyde thiosemicarbazone. Thus, the product is the intramolecular, cyclic hemiacetal of the formula:

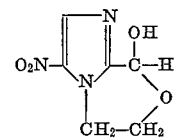

The addition of sodium iodide is unnecessary. The product is collected by filtration after ozone flow is terminated.

EXAMPLE 14

Preparation of 1-methyl-5-nitro-2-imidazole-carboxylic acid

In 60 ml. of 90% formic acid 10 g. of β-(1-methyl-5-nitro-2-imidazolyl)styrene is treated with ozone at 0 to −5° C. for 6½ hours. To the turbid mixture 100 ml. of ethyl acetate is added and after 10 minutes in an ice bath, the white solid is collected and washed with ethyl acetate to give 3.5 g. of 1-methyl-5-nitro-2-imidazolecarboxylic acid, melting point 84–85° C. (dec.).

EXAMPLE 15

Preparation of 1-methyl-5-nitro-2-imidazolecarboxylic acid

In 30 ml. of glacial acetic acid, 5 g. of β-(1-methyl-5-nitro-2-imidazolyl)styrene is treated with ozone at 15° C. for 3 hours to give 1-methyl-5-nitro-2-imidazolecarboxylic acid. The workup is identical with that described in Example 14.

EXAMPLE 16

Preparation of 1-methyl-5-nitro-2-imidazolecarboxaldehyde

In the manner described in Example 1, 11.0 g. (0.048 mole) of β-(1-methyl-5-nitro-2-imidazolyl)styrene in 120 ml. of methanol and 5 ml. of water is treated with ozone until a clear solution is obtained. A solution of 9.12 g. (0.048 mole) of sodium metabisulfite in 170 ml. of water is added slowly at 15° C. The mixture is then evaporated to dryness under reduced pressure at 75° C. to give a semisolid with no odor of benzaldehyde. This residue is dissolved in water and 4.37 g. of thiosemicarbazide and several drops of concentrated hydrochloric acid are added. After heating for 20 minutes on a steam bath the yellow crystals are collected and washed with ethanol. The product is 1-methyl-5-nitro-2-imidazolecarboxaldehyde thiosemicarbazone. If only 4.56 g. (0.024 mole) of sodium meta-bisulfite is used, the aldehyde is easily extracted with ethyl acetate after removal of benzaldehyde under reduced pressure.

The ozonized mixture also gives the aldehyde when either triethylphosphite or dimethylsulfide is used as a reducing agent.

EXAMPLE 17

Preparation of 1-benzyl-5-nitro-2-imidazolecarboxaldehyde

In the manner described in Example 1, 0.5 g. (1.64 millimole) of β-(1-benzyl-5-nitro-2-imidazolyl)styrene in 95% aqueous methanol is treated with ozone until a clear solution is obtained. To this solution at 15° C., 0.312 g. (1.64 millimole) of sodium meta-bisulfite ($Na_2S_2O_5$) in 3 ml. of water is added. The mixture is then evaporated to dryness under reduced pressure at 75° C. and the solid extracted with ethyl acetate. The ethyl acetate extracts are dried, evaporated to dryness to give a yellow-orange residue (probably bisulfite addition product) which solidifies upon standing. This material is dissolved in 20 ml. of aqueous methanol and 0.15 g. of thiosemicarbazide and a drop of 6 N hydrochloric acid are added. After refluxing for 15 minutes and cooling, 0.25 g., melting point 193–196° C., of 1-benzyl-5-nitro-2-imidazolecarboxyldehyde thiosemicarbazone is isolated. The use of a half of an equimolar amount of sodium meta-bisulfite affords the title aldehyde instead of the bisulfite addition product. When the ethyl acetate extract is evaporated to dryness and dissolved in 75% aqueous ethanol and semicarbazone is added, and the mixture is heated on a steam bath for 10 minutes, and sodium acetate is added, the semicarbazone derivative, melting point 226–228° C. is obtained.

EXAMPLE 18

Preparation of methyl-1-methyl-5-nitro-2-imidazolecarboxylate 1-methyl-5-nitro-2-imidazolecarboxylic acid (3.29 g. or 19.2 mmole) is added at 10° C. to 20 ml. of oxalyl chloride and stirred for 2½ days at 20–28° C. Subsequently, 10 ml. of benzene is added, the mixture filtered, and the filtrate evaporated to dryness to give a white solid. This solid is reacted with excess methanol (50 ml.) to give 3.93 g. of ester hydrochloride which is obtained when the solvent is removed. The methyl ester hydrochloride is washed with water to give methyl 1-methyl-5-nitro-2-imidazolecarboxylate. The ethyl ester is prepared in the same manner.

EXAMPLE 19

Utilization of compounds of the present invention in controlling *Trichomonas vaginalis* infections This example demonstrates, employing two modes of administration, the efficacy of the compounds of the present invention against *Trichomonas vaginalis* infections.

The first mode of administration, hereinafter designated Test A, employs ten mice per group. The mice are inoculated with 50,000 culture-derived *Trichomonas vaginalis* (Thoms strain). The test compound is thoroughly mixed into ground feed and presented to the mice on day after inoculation. The average adlibitum drug instake, that is milligrams per kilogram of body weight per day, is estimated from the drug diet intake for 5 full days, and mouse weights taken just before and just after treatment.

The second mode of administration, hereinafter designated Test B, employs ten mice per group. The mice are inoculated with 50,000 culture-derived *Trichomonas vaginalis* (Thoms strain). The test compound is administered in a single oral dose by gavage one day after inoculation.

Six days post inoculation, scrapings from the subcutaneous sites of inoculation, are searched microscopically for motile trichomonads, and antitrichomonal activity is concluded in those instances where motile trichomonads are eliminated from lesions present at the site of inoculation.

The results of the test are set forth in the following table:

TABLE

| Compound | Mice cleared/total mice [1] One gavage dose 24 hrs. postinoc., mg./kg. 400 | Drug diet: 24–144 hrs. postinoc. 0.1% (mg./kg./day) |
|---|---|---|
| 2-imidazolecarboxaldehyde, 1-benzyl,-5-nitro-, semicarbazone | 4/10 | |
| Imidazole, 1-benzyl-5-nitro-2-styryl-trans- | 2/10 | 0/10 (190) |
| 2-imidazolecarboxaldehyde, 1-benzyl-5-nitro-, thiosemicarbazone | 1/10 | 4/10 (185) |

[1] All of 40 untreated, sham-dosed mice harbored motile trichomonads.

What is claimed is:
1. A method for the preparation of a compound of the formula:

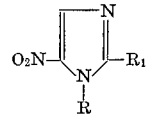

wherein R is a member selected from the group consisting of lower alkyl, phenyloweralkyl, hydroxyloweralkyl and lower alkanoyloxy loweralkyl and $R_1$ is a member selected from the group consisting of —CHO and —COOH, comprising treating with ozone at a temperature of from about —70° C. to 25° C. in a solvent a β-(1-substituted-5-nitro-2-imidazolyl)styrene of the formula:

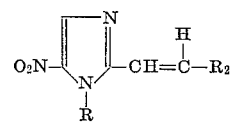

wherein R is as described above and $R_2$ is selected from the group consisting of phenyl, chlorophenyl, nitrophenyl, loweralkylphenyl, lower alkoxyphenyl, diloweralkylphenyl, dioweralkoxyphenyl, hydroxyphenyl, lower alkoxyhydroxyphenyl, dichlorophenyl, diloweralkyl aminophenyl, naphthyl and furyl, until a substantial amount of product is formed and recovering said compound therefrom.

2. A method according to claim 1 for preparation of compounds wherein $R_1$ is —CHO and R is a member selected from the group consisting of lower alkyl, phenyloweralkyl, hydroxyloweralkyl, and lower alkanoyloxyloweralkyl comprising treating with ozone at a temperature of —70° C. to 50° C. β-(1-substituted-5-nitro-2-imidazolyl)styrene in a solvent selected from the group consisting of loweralkyl alcohols, lower alkoxy lower alkyl alcohols, loweralkyl esters of lower alkanoic acids, acetonitrile, chlorinated hydrocarbons, strong mineral acids and aqueous alcoholic mixtures and subsequently subjecting said mixture to a reducing agent.

3. A method according to claim 1 for the preparation of compounds wherein $R_1$ is —CHO and R is hydroxyloweralkyl comprising treating β-(1-hydroxyloweralkyl-5-nitro-2-imidazolyl)styrene with ozone.

4. A method according to claim 1 for the preparation of compounds wherein $R_1$ is —COOH and R is a member selected from the group consisting of lower alkyl, phenyloweralkyl, hydroxyloweralkyl and loweralkanoyloxy lower alkyl comprising ozonizing β-(1-substituted-5-nitroimidazolyl)styrene in the presence of formic acid of a lower alkanoic acid.

5. A method according to claim 2 wherein the solvent is selected from the group consisting of loweralkyl alcohols, lower alkoxy loweralkyl alcohols, and said alcohol-water mixtures and the reaction is carried out at a temperature between about 0° C. and 50° C.

6. A method according to claim 2 wherein the reducing agent is selected from the group consisting of alkali iodides, dimethyl sulfide, lower trialkyl phosphites, sulfurous acid, sodium bisulfite and sodium thiosulfate.

7. A method according to claim 2 for the preparation of compounds wherein $R_1$ is —CHO and R is a member selected from the group consisting of methyl and ethyl comprising treating a compound selected from the group consisting of β-(1 - methyl-5-nitro-2-imidazolyl)-styrene and β-(1-ethyl-5-nitro-2-imidazolyl) styrene with ozone, subjecting the ozonized mixture to treatment with a reducing agent selected from the group consisting of alkali iodides, dimethyl sulfide, lower trialkyl phosphites, sulfurous acid, sodium bisulfite and sodium thiosulfate or heating to not more than 85° C. and recovering the thus formed product therefrom.

8. A compound of the formula:

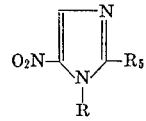

wherein R is benzyl; $R_5$ represents a member selected from the group consisting of —CHO, —CH=CH—$C_6H_5$, and

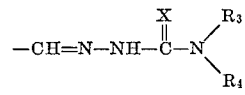

X is selected from the group consisting of sulfur and oxygen; $R_3$ and $R_4$ are members selected from the group consisting of hydrogen and lower alkyl having from 1 to 4 carbon atoms.

9. A method according to claim 2, wherein the mixture resulting from treatment with ozone is heated to a temperature of not more than 85° C.

References Cited

UNITED STATES PATENTS

| | | | |
|---|---|---|---|
| 3,378,552 | 4/1968 | Henry | 260—240 |
| 3,472,864 | 10/1969 | Henry et al. | 260—240X |

OTHER REFERENCES

Conant: The Chemistry of Organic Compounds, revised edition, pp. 139–140 and 373, The MacMillan Co. (1939).

Iversen et al.: Acta Chemica Scand., vol. 21, No. 1, pp. 279–281 (1967).

JOHN D. RANDOLPH, Primary Examiner

U.S. Cl. X.R.

260—306.8, 307, 309; 424—273